United States Patent
Espy et al.

(10) Patent No.: US 12,443,476 B2
(45) Date of Patent: Oct. 14, 2025

(54) METHOD FOR DETECTING AND REPORTING AN OPERATION ERROR IN AN IN-VITRO DIAGNOSTIC SYSTEM AND AN IN-VITRO DIAGNOSTIC SYSTEM

(71) Applicant: Roche Diagnostics Operations, Inc., Indianapolis, IN (US)

(72) Inventors: Christopher Espy, Mannheim (DE); André Pristat-Gupta, Mannheim (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 211 days.

(21) Appl. No.: 18/123,789

(22) Filed: Mar. 20, 2023

(65) Prior Publication Data
US 2023/0229541 A1    Jul. 20, 2023

Related U.S. Application Data

(63) Continuation of application No. PCT/EP2021/075271, filed on Sep. 15, 2021.

(30) Foreign Application Priority Data

Sep. 21, 2020   (EP) .................................... 20197278

(51) Int. Cl.
G06F 11/00     (2006.01)
G06F 11/07     (2006.01)

(52) U.S. Cl.
CPC ........ G06F 11/0775 (2013.01); G06F 11/079 (2013.01)

(58) Field of Classification Search
CPC ............................ G06F 11/0775; G06F 11/079
(Continued)

(56) References Cited

U.S. PATENT DOCUMENTS 8,505,035 B2 *   8/2013   Ulrich ................... G06F 11/261
                                                          714/39
9,015,536 B1 *   4/2015   Ricken ................. G06F 11/079
                                                          714/47.2
(Continued)

FOREIGN PATENT DOCUMENTS

CN    104301136 B    6/2018
CN    108984613 A   12/2018
(Continued)

OTHER PUBLICATIONS

International Search Report and Written Opinion of the International Searching Authority; European Patent Office; International Application No. PCT/EP2021/075271; Jan. 4, 2022; 19 pages.
(Continued)

*Primary Examiner* — Sarai E Butler
(74) *Attorney, Agent, or Firm* — Taft Stettinius & Hollister LLP (57) ABSTRACT

The present disclosure refers to a method for detecting and reporting an operation error in an in-vitro diagnostic system (1) for determining a sample of a bodily fluid, comprising: providing a plurality of sample vessels (2) each containing a sample of a bodily fluid; and providing a plurality of functional modules (3), comprising an analysis device (4) configured to determine the sample, a handling system (5) configured to handle the plurality of sample vessels (2), and an automation track (6) provided by the handling system (5) and configured to transport the plurality of sample vessels (2) to the analysis device (4). The method further comprises: providing an operation control device (7) connected to at least one of the functional modules (3) and configured to control operation of the at least one functional module (3), and comprising one or more data processors (8), wherein an
(Continued)

application software is running on the one or more data processors (8) for controlling operation of the at least one functional module (3); controlling operation of the at least one functional module (3) by the operation control device (7); and detecting and reporting an operation error by an error detecting and reporting device (9), comprising: detecting the operating error for the operation of at least one of the plurality of functional modules (3) and the operation control device (7), providing error data indicative of the operation error, receiving a user input through a user interface (10) after detecting the operation error, providing labelling data in response to receiving the user input, the labelling data being indicative of information related to the operating error in addition to the error data, providing error report data comprising the error data and the labelling data, and transmitting the error report data to an error repository (11) remotely located with respect to both the plurality of functional modules (3) and the operation control device (7); receiving the error report data in a machine learning process running in a data processing device connected to the error repository (11); processing the error report data by the machine learning process in the data processing device; providing a application software update for the application software in response to the processing of the error report data by the machine learning process in the data processing device; providing the application software update to the operation control device (7); and controlling operation of the at least one functional module (3) by the operation control device (7) comprising running the application software including the application software update. Further, an in-vitro diagnostic system for determining a sample of a bodily fluid is provided.

20 Claims, 2 Drawing Sheets

(58) Field of Classification Search
USPC .......................................................... 714/1–57
See application file for complete search history.

(56) References Cited

U.S. PATENT DOCUMENTS

| | | | |
|---|---|---|---|
| 9,430,312 | B2 | 8/2016 | Ishii |
| 11,461,216 | B1* | 10/2022 | Jain .......................... G06N 20/00 |
| 11,687,437 | B1* | 6/2023 | Jain .......................... G06N 20/00 |
| | | | 714/25 |
| 2007/0174653 | A1 | 7/2007 | Berman et al. |
| 2009/0006883 | A1* | 1/2009 | Zhang ................... G06F 11/366 |
| | | | 714/1 |
| 2009/0199052 | A1 | 8/2009 | Yamaguchi et al. |
| 2013/0311834 | A1* | 11/2013 | Friedlander ......... G06F 11/0793 |
| | | | 714/47.1 |
| 2014/0214733 | A1* | 7/2014 | Alonso ..................... G06N 3/02 |
| | | | 706/12 |
| 2015/0227409 | A1* | 8/2015 | Ricken .................... G16Z 99/00 |
| | | | 714/47.2 |
| 2015/0347212 | A1* | 12/2015 | Bartley ............... G06F 11/0709 |
| | | | 714/37 |
| 2018/0232657 | A1 | 8/2018 | Acharya et al. |
| 2019/0033209 | A1 | 1/2019 | Kluckner et al. |
| 2019/0102700 | A1 | 4/2019 | Babu et al. |
| 2019/0286100 | A1* | 9/2019 | Mizusawa .......... G05B 19/4063 |
| 2020/0344252 | A1* | 10/2020 | Menon ................ G06F 11/3006 |

FOREIGN PATENT DOCUMENTS

| | | |
|---|---|---|
| CN | 109635968 A | 4/2019 |
| EP | 3171302 A1 | 5/2017 |
| EP | 3408640 | 8/2017 |
| EP | 3408641 | 8/2017 |
| EP | 3517970 A1 | 7/2019 |
| GB | 2573336 A | 11/2019 |
| WO | 2016038014 A1 | 3/2016 |
| WO | 2019089578 A1 | 5/2019 |
| WO | 2022058324 A1 | 3/2022 |

OTHER PUBLICATIONS

International Preliminary Report on Patentability, The International Bureau of WIPO, International Patent Application No. PCT/EP2021/075271, Mar. 21, 2023, 12 pages.

* cited by examiner

Fig. 1

METHOD FOR DETECTING AND REPORTING AN OPERATION ERROR IN AN IN-VITRO DIAGNOSTIC SYSTEM AND AN IN-VITRO DIAGNOSTIC SYSTEM

CROSS-REFERENCE TO RELATED APPLICATIONS

This application is a continuation of International PCT Application No. PCT/EP2021/075271 filed on Sep. 15, 2021, which claims priority to European Patent Application No. 20197278.3 filed on Sep. 21, 2020, the contents of each application are incorporated herein by reference in their entireties.

The present disclosure refers to a method for detecting and reporting an operation error in an in-vitro diagnostic system configured to determine a sample of a bodily fluid, and an in-vitro diagnostic system.

BACKGROUND

In-vitro diagnostic systems are applied for determining samples of a bodily fluid. The samples are received in sample vessels or containers which are processed in an in-vitro diagnostic system. The sample vessels may handled by a sample vessel handling or distribution system, for example for locating the sample vessel in sample vessel carriers and for picking up the sample vessels from the sample vessel carriers. For example, a laboratory sample distribution system is disclosed in WO 2018/038014 A1.

In the in-vitro diagnostic system, the sample vessels are moved along a line of processing for processing, wherein the sample vessels and/or sample vessel carriers are moved by means of a transporting device having one or more actuators and actuator drivers or driving devices for driving the actuator(s). For example, the sample vessels may be moved or relocated from a first working station to a second working station provided in the line of processing in the in-vitro diagnostic system. The working stations may also be referred to as working location.

The diagnostic systems are currently performing quality control in the field using pre-installed algorithms. In particular, the current software solutions for a quality check of samples in such diagnostic systems are usually camera-based and are not developed based on the behavior of a system installed in the field.

A system for a camera based quality check of samples is disclosed in the documents US 2019/0 033 209 A1, EP 3 408 640 A1, and EP 3 408 641 A1, A model-based method for quantifying a specimen is disclosed. The method includes providing a specimen, capturing images of the specimen while illuminated by multiple spectra at different nominal wave-lengths, and exposures, and classifying the specimen into various class types comprising one or more of serum or plasma portion, settled blood portion, gel separator (if used), air, tube, label, or cap; and quantifying of the specimen. Quantifying includes determining one or more of: a location of a liquid-air interface, a location of a serum-blood interface, a location of a serum-gel interface, a location of a blood-gel interface, a volume and/or a depth of the serum or plasma portion, or a volume and/or a depth of the settled blood portion.

Document EP 3 171 302 A1 discloses a method for generating an entry for an electronic laboratory journal including selecting a laboratory workflow specifying at least one action an operator has to carry out, wherein the action involves one or more pieces of laboratory equipment, recording one or more images or videos of the action by the operator by using a camera associated with an augmented-reality device worn by the operator and generating an entry for an electronic laboratory journal based on the recorded one or more images or videos.

The disclosure in document CN 108 984 613 A refers to a cross-item classification method of a defect report based on transfer learning, the method comprising: selecting data, determining source data and target data, and preprocessing the data; calculating a vector representation of each defect report in the step by training the defect report semantic model; dividing the source data and the target data in the step into training data and test data, and adjusting the weight of the training data by transfer learning to minimize the error of the classification result; using the data training classifier migrated in step to classify the target data across items through the machine learning classifier.

A system including a computing device that includes a memory configured to store instructions is disclosed in document WO 2019/089 578 A1. The system also includes a processor to execute the instructions to perform operations that include receiving an image that includes textual content in at least one font. Operations also include identifying the at least one font represented in the received image using a machine learning system. There is machine learning system being trained using images representing a plurality of training fonts. A portion of the training images includes text located in the foreground and being positioned over captured background imagery.

Document US 2018/232 657 A1 discloses a method and system for generating a cognitive insight comprising: receiving training data, the training data being based upon interactions between a user and a cognitive learning and inference system; performing a plurality of machine learning operations on the training data; generating a cognitive profile based upon the information generated by performing the plurality of machine learning operations; and, generating a cognitive insight based upon the profile generated using the plurality of machine learning operations.

The disclosure in document US 2019/102 700 A1 relates to an integrated machine learning platform. The machine learning platform can convert machine learning models with different schemas into machine learning models that share a common schema, organize the machine learning models into model groups based on certain criteria, and perform pre-deployment evaluation of the machine learning models. The machine learning models in a model group can be evaluated or used individually or as a group. The machine learning platform can be used to deploy a model group and a selector in a production environment, and the selector may learn to dynamically select the model(s) from the model group in the production environment in different contexts or for different input data, based on a score determined using certain scoring metrics, such as certain business goals.

A fault repair reporting management method based on a customer service is disclosed in document CN 109 635 968 A. The method comprises the steps of obtaining voice information of a repair reporting user; analyzing the voice information to obtain text information corresponding to the voice information; generating a repair work order through a keyword capture algorithm according to the text information and a preset keyword library; and distributing the repair work order to a target terminal and receiving feedback information sent by the target terminal.

Document CN 1 043 011 368 B discloses a method and equipment for reporting and processing fault information. The method comprises the steps that logs of the user equipment are analyzed according to preset relevant parameters of the fault information, and the fault information can be obtained from the logs, wherein the preset relevant parameters of the fault information comprise fault keywords. According to the obtained fault information, fault files are generated and reported to a server, wherein the fault files comprise the fault keywords.

Document EP 3 517 970 A1 refers to a system for a service department to contact a customer for improving customer service when it is determined that the customer has difficulty in handling an alarm by themselves in the case where the alarm is generated due to abnormality of an automatic analyzer and the automatic analyzer is deactivated. The automatic analyzer includes: a display to display an alarm screen; a computer that generates alarm generation information that indicates that an alarm has been generated due to abnormality and alarm deletion information that indicates that the customer has deleted the alarm displayed on the alarm screen based on the alarm generation information; and an information sharing portion that shares the alarm generation information and alarm deletion information that are generated by the computer with an external alarm maintenance system.

Document US 2009/199 052 A1 refers to a management system including a plurality of analyzers; and a computer system connected to the analyzers via a network, wherein each of the analyzers comprises: a data transmitter for transmitting data produced by the analyzer to the computer system via the network, and wherein the computer system includes a memory under control of a processor, the memory storing instructions enabling the processor to carry out operations, comprising: (a) receiving a plurality of data transmitted from the data transmitters of the plurality of analyzers; (b) generating an aggregate result used for determining a determination condition for making a determination as to whether or not a notification to a user of the analyzer is required based on the plurality of received data; and (c) outputting the aggregate result. A computer system and a method of providing information are also disclosed.

Document US 2007/174653 A1 discloses an automated laboratory device that comprises a mechanism that performs operations on laboratory samples, a scheduler that causes the mechanism to process laboratory samples in accordance with programmed processes, logic that detects an error occurring in a process controlled by the scheduler, logic that accepts a user-defined error handling routine for the error, and logic that executes the error handling routine when the error is encountered. Also described are a laboratory automation system, a method of laboratory automation, a computer implemented software program product, a method of doing business, and a laboratory automation network.

Document GB 2 573 336 A discloses a modular medical apparatus, e.g. an in vitro diagnostic (IVD) device, which is self-tested for faults using sensors and actuators already present in the modules of the apparatus, which are used to perform test runs to check for abnormal operation in the device. The actuators can be pumps or stepper motors. Peltier elements, RFID sensors, acoustic or optical sensors, or sensors for capacitance, pressure, flow or fill level. The sensors may also be rotary or linear encoders or RFID receivers. The modular apparatus includes pipettors, pumps, modules for washing reaction vessels, thermostat modules, or modules for measuring reaction strength. Test sequences are repeated over time and the data compared to indicate an impending fault.

Document U.S. Pat. No. 9,430,312 B2 refers to a system including an analyzer that analyzes a sample, or a processing device that pre-processes the sample, and a management device that manages at least one of the analyzer and the processing device, wherein the management device includes: error detection means that detects errors in the analyzer or the processing device, storage means having stored therein an operator notification management table in which at least one operator is registered per kind of error; error notification means that notifies an error that the error detection means has detected to operators who are to individually handle the error, the means notifying on the basis of the operator notification management table and in accordance with the kind of error detected by the error detection means, and registration means that registers an operator, who has handled the error as a troubleshooter, among operators to whom the error was notified from the error notification means.

SUMMARY

It is an object to provide a method for detecting and reporting an operation error in an in-vitro diagnostic system configured to determine a sample of a bodily fluid with improved technique to avoid operation errors. Also, an in-vitro diagnostic system is to provide which allows for safe operation.

For solving the problem, a method for detecting and reporting an operation error in an in-vitro diagnostic system configured to determine a sample of a bodily fluid, and an in-vitro diagnostic system according to the independent claims 1 and 12, respectively, are provided. Additional embodiments are referred to in the dependent claims.

According to an aspect, a method for detecting and reporting an operation error in an in-vitro diagnostic system configured to determine a sample of a bodily fluid is provided, the method comprising, in an in-vitro diagnostic system; providing a plurality of sample vessels each containing a sample of a bodily fluid; and providing a plurality of functional modules, comprising an analysis device configured to determine the sample, a handling system configured to handle the plurality of sample vessels, an automation track provided by the handling system and configured to transport the plurality of sample vessels to the analysis device. The method is further comprising: providing an operation control device connected to at least one of the functional modules and configured to control operation of the at least one functional module, and comprising one or more data processors, wherein an application software is running on the one or more data processors for controlling operation of the at least one functional module; controlling operation of the at least one functional module by the operation control device; and detecting and reporting an operation error by an error detecting and reporting device, comprising: detecting the operating error for the operation of at least one of the plurality of functional modules and the operation control device; providing error data indicative of the operation error; receiving a user input through a user interface after detecting the operation error, providing labelling data in response to receiving the user input, the labelling data being indicative of information related to the operating error in addition to the error data, providing error report data comprising the error data and the labelling data, and transmitting the error report data to an error repository remotely located with respect to both the plurality of functional modules and the operation control device. The method further comprises: receiving the error report data in a machine learning process running in a data processing device connected to the error repository; processing the error report data by the machine learning process in the data processing device; providing an application software update for the application software in response to the processing of the error report data by the machine learning process in the data processing device; providing the application software update to the operation control device; and controlling operation of the at least one functional module by the operation control device comprising running the application software including the application software update.

According to another aspect, an in-vitro diagnostic system for determining a sample of a bodily fluid is provided, comprising: a plurality of sample vessels each containing a sample of a bodily fluid; and a plurality of functional modules, comprising an analysis device configured to determine the sample, a handling system configured to handle the plurality of sample vessels, and an automation track provided by the handling system and configured to transport the plurality of sample vessels to the analysis device. An operation control device is connected to at least one of the functional modules and configured to control operation of the at least one functional module, and comprising one or more data processors. An application software is running on the one or more data processors for controlling operation of the at least one functional module. An error detecting and reporting device is configured to detect and report an operation error, comprising: detect the operating error for the operation of at least one of the plurality of functional modules and the operation control device, provide error data indicative of the operation error, receive a user input through a user interface after detecting the operation error, provide labelling data in response to receiving the user input, the labelling data being indicative of information related to the operating error in addition to the error data, provide error report data comprising the error data and the labelling data, and transmit the error report data to an error repository remotely located with respect to both the plurality of functional modules and the operation control device. The in-vitro diagnostic system further comprises a data processing device connected to the error repository and configured to: receive the error report data in a machine learning process running in the data processing device; process the error report data by the machine learning process; provide a application software update for the application software in response to the processing of the error report data by the machine learning process, wherein the application software update is to be provided to the operation control device for controlling operation of the at least one functional module by the operation control device comprising running the application software including the application software update.

Not only data indicative of the operation error as such, namely error data, are provided, but also additional information gathered from the user conducting operational measures for operating the in-vitro diagnostic system. Such additional information is provided by the labelling data. Thus, the error report data comprising both the error data and the labelling data received (and stored) in the error repository provide for an improved method for error or fault analysis for in-vitro diagnostic system, not only in the field. i.e. location of use for the in-vitro diagnostic system, but also remotely. For example, development teams may have access to the error report data.

The machine learning process may be configured to provide the application software update.

In an embodiment, during commissioning of the in-vitro diagnostic system in the field, the operation control device may be initially provided with pre-installed application software. However, the pre-installed software may cause operation errors. In particular, the operation errors may be systematical errors. Without a learning process, the errors, for example systematical errors, usually would remain. By reporting errors, e.g. via error report data, a machine learning process can learn from these errors, specifically systematical errors can be identified. In other words, the errors (in particular error report data) may be provided as training data and/or validation data as input for the machine learning process. The machine learning process may be the same that may have been used to pre-install software of the in-vitro diagnostic system, in particular the operation control device. The machine learning process is provided to calculate or determine an updated application software (e.g. operation model) for the operation control device that causes less errors than the pre-installed application software.

The error report data received by the machine learning process may be indicative of errors of the in-vitro diagnostic system and/or of errors of further in-vitro diagnostic systems in the field.

The machine learning process may learn without supervision of developers, thereby, automatically conducting machine learning in response to receiving the error report data. Such automated machine learning process may be automatically initiated after receiving error report data indicative of an operation error or in response to having received error report data for a pre-defined number of operation errors in the error repository.

Alternatively, the machine learning process may be supervised by developers. The error report data in the error repository can be provided for developers. The developers can provide a second machine learning process that is different from the first machine learn process. The developers can select one or more error report data from the plurality of error report data, wherein the selected error report data may or may not be included in the training data. In an embodiment, only the selection of the error report data may be received by the machine learning process.

Typical types of errors which may be reported via error report data (error report data) may comprise at least one of the following: errors raised by the system related to the amount or type of material/bodily fluid detected in the sample container, errors raised related to the identification of the sample container, errors raised related to the determination of the quality of the material in the sample container, and errors raised related to.

In response to processing of the error report data with the machine learning process, a new application software for the operation control device may be provided. The new application software for the operation control device may be different from the application software for the operation control device currently provided in the in-vitro diagnostic system in the field. The application software for the operation control device currently provided in the in-vitro diagnostic system in the field (old application software) may be overwritten by the new application software. Alternatively merely the part that is indicative of the difference between the old and the new application software may be incorporated into the old application software (i.e., providing an application software update).

In an embodiment, the method further comprises preprocessing the error report data in the data processing device, wherein the preprocessing comprises formatting the error report data to formatted error report data having a data format processable by the machine learning process. The data processing device may be comprised by or functionally connected to the error repository for accessing the error report data. Preprocessing, for example, may include at least one of decompressing and/or decoding data packages, and restructuring if the data are stored in a hierarchical format.

The preprocessing of the error report data in the data processing device may comprise converting analogue data into a digital data, in particular converting analogue error data or analogue labelling data into digital error data or digital labelling data. Further, for example, one or more features may be selected from the error data. The feature may be indicative for one or more operation parameters of the in vitro diagnostic system. The processing device may be provided for such a feature selection of the error data. Alternatively, the error repository may be provided for such a feature selection from the error data. The error data may be formatted such that a feature vector is provided that may comprise these selected features. The feature vector may be an n-dimensional vector indicative of n features. Alternatively, the feature vector may be a scalar. In a preferred embodiment, the feature vector is a numerical vector.

The labelling data may be formatted such that a target is provided that is linked to the error data, in particular to the feature vector. In other words, the target labels the error data, in particular the feature vector. The target may be indicative of the labelling data. The target may be indicative of the type of the operation error. The target may be a scalar or vector. The target may be a numerical scalar or vector.

The target and the feature vector may be provided as input data for the machine learning process or algorithms. The target and the feature vector may be incorporated in a training dataset. The training dataset comprises training entries. The feature vector together with the target may define one training entry. The feature vector may be incorporated into a feature matrix and the target may be incorporated into a target vector/matrix, respectively. In particular, the feature vector and the target may be provided such that they can be used to train algorithms as nearest neighbor classification, neural networks, and statistical techniques such as Bayesian approaches. Alternatively the feature vector and the target may be provided to train other machine learning algorithms/processes. The scalars, vectors and matrices disclosed herein may be provided as bit vectors. Newly formatted error report data can easily be fed into existing machine learning algorithms. In particular, newly formatted error report data can complement previously formatted error report data. With each error detected, new error report data can be formatted and fed into the machine learning algorithms generating a successively increasing set of error report data. A successively increasing set of error report data can be accompanied by to a successively increasing set of training data. A larger set of training data may be related to more precise results of the machine learning algorithms.

The error data may be indicative of an operation error of the analysis device. In another embodiment, the error data may be indicative of an operation error of the handling system. In addition or as an alternative, the error data may be indicative of an operation error of the automation track. The error data may be indicative of the operating parameter of at least one of the analysis device, the handling system, or the automation track. In particular, the error data may be indicative of the operating parameter of at least one of the analysis device, the handling system, or the automation track at the time the error occurred, i.e. has been detected or reported. Alternatively, the error data may be indicative of the operating parameter of at least one of the analysis device, the handling system, or the automation track at a time before the error occurred. The error data may be indicative of a functional value that is determined by a function of the operating parameter of the analysis device, the handling system, and/or the automation track. For example, the error data may be indicative of a mean value (alternatively a maximum, minimum, median, etc.) of the operating parameter of the analysis device, the handling system, and/or the automation track in a time prior to the occurrence of the error.

The error data may be indicative of one of a false positive error and a false negative error. In medical testing, and more generally in binary classification, a false positive is an error in data reporting in which a test result improperly indicates presence of a condition, such as a disease (the result is positive), when in reality it is not present, while a false negative is an error in which a test result improperly indicates no presence of a condition (the result is negative), when in reality it is present. These are the two kinds of errors in a binary test (and are contrasted with a correct result, either a true positive or a true negative.) They are also known in medicine as a false positive (respectively negative) diagnosis, and in statistical classification as a false positive (respectively negative) error. A false positive is distinct from overdiagnosis, and is also different from overtesting. With respect to a binary classification of the error, the user can merely have two options to label error data, for example, "0" or "1", i.e. false negative or false positive. With respect to a binary classification of the error, the target may only be a scalar with two possible entries, for example, the entries "0" or "1". Alternatively, with respect to a binary classification of the error, the target may be a scalar with three possible entries, for example, false negative, false positive, or correct. The target could also have four possible entries, for example, false negative, false positive, correct negative, or correct positive. For example, a false negative can be detected, when a tube or sample vessel is incorrectly sorted into an error rack. The error rack may comprise sample vessels which are classified as negative.

The receiving of the user input may further comprise: providing user information data indicative of a plurality of types of operation errors; outputting the user information data through a display device, thereby, presenting a menu of the plurality of types of operation errors on the display device; receiving the user input through the user interface, the user input being indicative of a user selection of at least one of the plurality of types of operation errors; and providing labelling data assigned to the at least one of the plurality of types of operation errors selected by the user.

A memory may be provided comprising the plurality of types of operation errors, for example, in a list. In response to the receiving of a first user input, the list can be shown to the user on the display device. Alternatively, the plurality of types of operation errors can be saved in the memory in different categories (optionally in further different subcategories or sub-subcategories). In response to the receiving of the first user input, the categories can be shown to the user on the display device. In response to a second user input indicative of the category selected by the user, corresponding types of operation errors of the selected category may be shown to the user on the display device. In the event that several subcategories (sub-subcategories) are provided, a further user input (user inputs) may be received until the types of operation errors corresponding to the finally selected subcategory (sub-subcategories) are presented/shown to the user on the display device.

For example, in the memory, the plurality of types of operation errors may be categorized by operation errors of different functional modules or the operation control device.

In particular, the plurality of types of operation errors may be categorized in operation errors of the analysis device, the handling device, and the automation track. The plurality of types of operation errors may be stored, for example, in the memory such that to each of the operation error of the analysis device, the handling device, the automation track, and/or the operation control device corresponding (standard) types of operation errors are linked.

The user interface receiving the user input may comprise buttons, a joystick, a touch screen, a microphone, a scanning device, and/or a video camera.

Presenting a menu of the plurality of types of operation errors on the display device may comprise presenting a handful of possible standard errors for the user to select from. In addition, the option can be provided that the user may write something else indicative of a non-standard error. In response to receiving a user input indicative of the non-standard error, the non-standard error may be stored in the memory. The non-standard error may be linked to at least one of the analysis device, the handling device, the automation track, and/or the operation control device.

The user input may be indicative of a new type of operation error. The new type of operation error may not be stored in the memory prior to the user input. In response of the user input being indicative of the new type of operation error, the new operation error may be stored in the memory. The new type of operation error may be incorporated in the plurality of operation errors. The user may enter the new type of operation error, e.g. via a keypad, a gesture recognition system, or a voice recognition system.

The user input may also be indicative of a type of operation error that is new for one of the categories. The type of operation error that is new for one of the categories may not be stored in the memory in the corresponding category prior to the user input. In response to the user input being indicative of the type of operation error that is new for one of the categories, the type of operation error that is new for one of the categories may be stored in the memory. The type of operation error that is new for one of the categories may be incorporated in the corresponding category in the memory. In other words, the type of operation error that is new for one of the categories may be linked to this category in the memory. The user may enter the type of operation error that is new for one of the categories (e.g., via a keypad, a gesture recognition system, or a voice recognition system).

The providing of the user information data may comprise receiving reading data from a data carrier reading device, the reading data being indicative of sample vessel data stored in a data carrier provided on the sample vessel; and providing the user information data in response to receiving the reading data.

The data carrying reading device may comprise a scanning device, for example a barcode scanner or a QR code scanner. Alternatively, the data carrying reading device may comprise a camera device or a RFID reader. The reading data being indicative of sample vessel data stored in the data carrier provided on the sample vessel may comprise typical user information data, in particular types of operation errors, related to this sample vessel. These typical types of operation errors may be provided, for example, in response to historically detected and reported operation errors relating to this sample vessel. Alternatively, the reading data being indicative of sample vessel data stored in the data carrier provided on the sample vessel may comprise a unique identification number. For example, in the memory device, to each of the plurality of types of operation errors one or more unique identification number may be related to. In response to the receiving of the unique identification number, operation errors relating to this unique identification number may be provided. These operation errors relating to this unique identification number may then be provided/shown to the user on the display device. To which of the plurality of types of operation errors the unique identification number is related to may depend on historically detected and reported operation errors relating the corresponding sample vessel and/or may be preset.

To each sample vessel a corresponding category comprising one or more types of operation errors may be provided. The category comprising the one or more types of operation errors corresponding to one of the sample vessel may comprise types of operation errors relating to this sample vessel. In the memory, to each of the stored operation errors one or more sample vessels may be linked. In response to receiving reading data, one of the category corresponding to one of the sample vessel may be selected. The operation errors stored in the selected category may then be provided/shown to the user on the display device.

The providing of the user information data may comprise receiving user message data from an input device, the user message data being indicative of at least one of a user video message input and a user audio message input; and providing the user information data in response to receiving the user message data.

For example, in the memory, a plurality of types of operation errors may be provided. It may therefore be intended that the user can make a pre-selection via the user input device or the input device. e.g. before the user information data indicative of the (selected) plurality of operation errors is output on the display device. The user input device may comprise the input device. A part of the (overall) plurality of operation errors may be provided in response to the receiving of the user massage data. In particular, in response to the receiving of the user massage, a specific category (or subcategory or sub-subcategory) of the (overall) plurality of operation errors may be provided (e.g., related to the analysis device, the handling device, the automation track, or the sample vessel). The user information data may be indicative of the part (category, subcategory or sub-subcategory) of the (overall) plurality of operation errors.

The video message input can be provided by a camera. A gesture recognition device may be provided. The input device may comprise the camera and/or the gesture recognition device. The attention of the user can be constantly monitored by the camera. If the user does not look in the direction of the camera, the attention may be classified as negative and the camera rests in a standby mode. If the attention is classified as positive, i.e. the user is looking in the direction of camera, the camera may be turned on. Alternatively, the camera can be turned on constantly. In another exemplary embodiment, the camera can be switched between on and standby mode by other input devices such as buttons, touch screen, joystick, or microphone. If the camera is turned on, pictures (a video) of the user may be provided and received by the gesture recognition device. The gesture recognition device may recognize gestures of the user (captured by the camera). In response the recognition of the gesture of the user, corresponding user (video) massage data may be provided by the gesture recognition device. If the camera is in standby mode, pictures (a video) of the user may not be received by the gesture recognition device. If the user provides gesture language characters, the gesture recognition device can convert the gesture language characters into v-text. The user (video) massage data may comprise the v-text.

The audio message input can be provided by a microphone. A voice recognition device may be provided. The input device may comprise the microphone and/or the voice recognition device. The microphone may comprise the modes standby and on. If the microphone is turned on, audio data of the user may be provided and received by a voice recognition device. In response to the receiving of the audio data of the user, corresponding user (audio) massage data may be provided by the voice recognition device. If the microphone is in standby mode, audio data of the user may not be received by the voice recognition device. The voice recognition device can convert the audio data into a-text. The user (video) massage data may comprise the a-text. The microphone may be turned on constantly. Alternatively, the microphone generally rests in standby mode and turns on in response to a specific user input. The specific user input may be a specific spoken phrase. Examples for such a spoken phrase may be: "Hello <name of the in-vitro diagnostic system>". "Bug report", "Error report", and similar. Alternatively, the microphone can be switched between on and standby mode by other input devices such as buttons, touch screen, joystick, and/or camera.

In the method, the providing of the user information data may comprise outputting a visual representation of one of the functional module from the plurality of functional modules and the operation control device through the display device; and receiving a user selection input indicative of the user selecting the visual representation.

In the memory, the whole plurality of types of operation errors may be stored. In addition, in the memory, each type of operation error can or cannot be linked to one or more of the functional modules or the operation control device. In response the user selection of a visual representation of one of the functional modules or the operation control device, a part of the whole plurality of types of operation errors may be provided. The part of the (whole) plurality of types of operation errors may be selected in such a way that it comprises the types of operation errors that are linked to the selected functional module or the operation control device. In other words, the plurality of types of operation errors is categorized in different categories in the memory. In response to the selection of the visual representation of one of the functional modules from the plurality of functional modules and the operation control device, one of the categories may be selected. The display device may be provided for the user selection. Alternatively, buttons, a joystick, a touch screen, a microphone, a scanning device, and/or a video camera may be provided for the user selection. In addition, in response the user selection of a visual representation of one of the functional modules or the operation control device, the user may enter a new type of operation error (e.g., via a keyboard, the gesture recognition device, or the voice recognition device).

In response the user selection of a visual representation of one of the functional modules or the operation control device, the display device may present a menu of the part of the plurality of types of operation errors. The part of the plurality of types of operation errors may be indicative of the types of operation errors that are linked to the selected functional module or the operation control device.

The method may further comprise: receiving a user error report message within the receiving of the user input; generating user error report message data indicative of the user error report message; and providing the labelling data including the user error report message data. In addition to the selection of the type of operating error, user error report message may be provided. The user error report message may comprise further information about the selected operating error. In other words, the user error report message is indicative of details about the selected type of operation error, in particular details that are not provided by the error data or which are inherently comprised by the type of operation error. The user error report message may be a text massage, a voice massage, an image massage, and/or a video massage. The user report message data may comprise text, a sound file, images, and or video. In a preferred embodiment the user report message data may only comprise text data. The user input device (providing the user input) may comprise the voice recognition device with the microphone. The voice recognition device may convert the voice massage into a voice-to-text massage (indicative of the text massage). The user input device (providing the user input) may comprise the gesture recognition device with the camera. The gesture recognition device may convert the video massage (of the user) into a video-to-text massage (indicative of the text massage). The gesture recognition device may convert the image massage (of the user) into an image-to-text massage (indicative of the text massage).

With respect to the in-vitro diagnostic system configured to determine a sample of a bodily fluid, the embodiments described for the method for detecting and reporting an operation error in the in-vitro diagnostic system may apply mutatis mutandis.

DESCRIPTION OF FURTHER EMBODIMENTS

Figure 1:
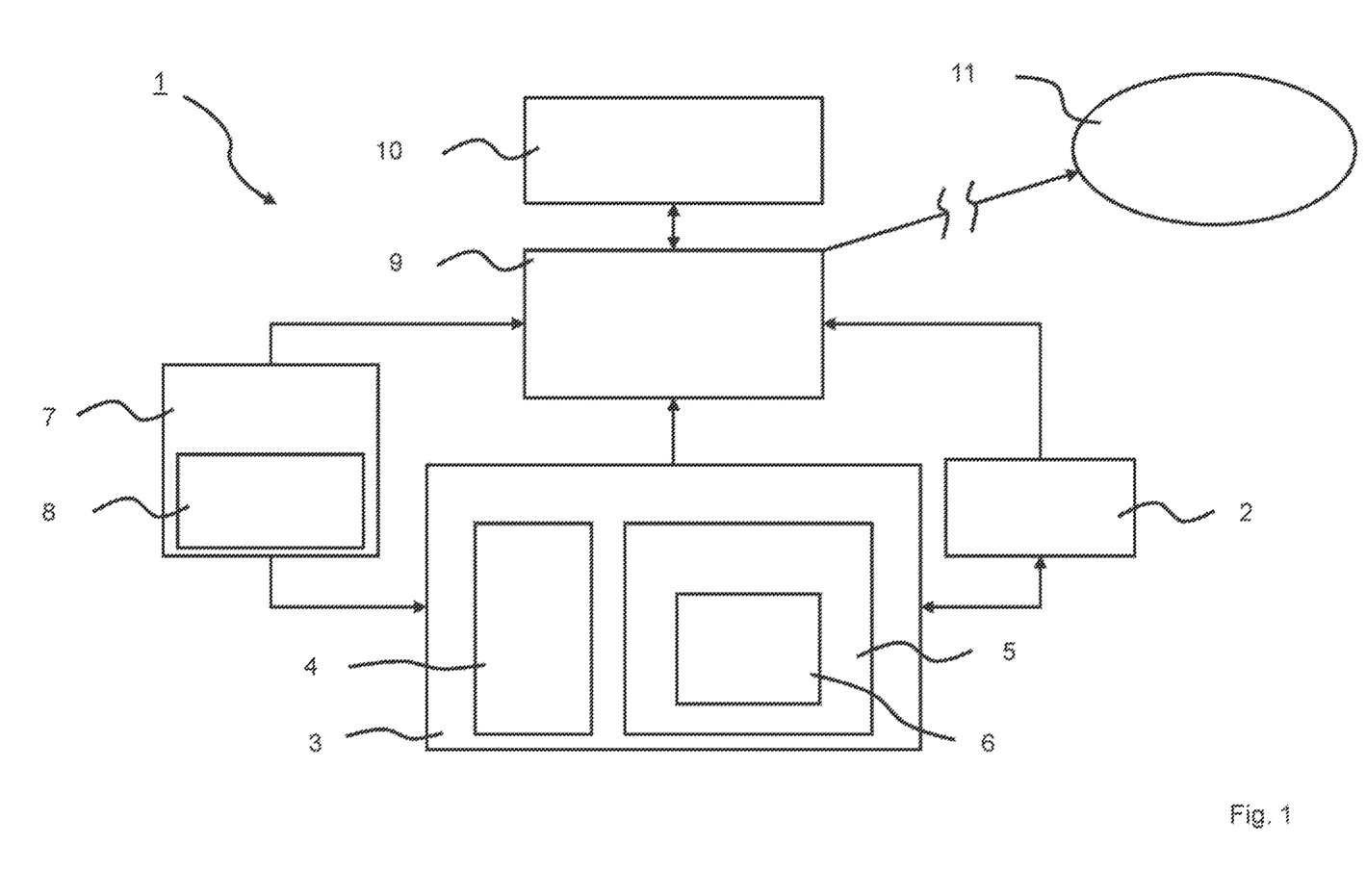
FIG. 1 a schematic representation of functional modules or components of an in-vitro diagnostic system configured to determine a sample of a bodily fluid, and FIG. 2 a schematic block diagram for a method of detecting and reporting an operation error in an in-vitro diagnostic system.

Following, further embodiments are described by referring to figures. In the figures, show:

FIG. 1 shows a schematic representation of functional modules or components of an in-vitro diagnostic system 1 configured to determine a sample of a bodily fluid.

The bodily fluid is contained in the sample vessels 2. In particular, for handling and analyzing the sample, a plurality of functional modules 3 is provided. The plurality of functional modules 3 may comprise an analysis device 4, a handling system 5, and an automation track 6. The analysis device 4 is configured to determine the sample. For example, a blood glucose level may be determined for the sample. Alternatively or in addition, some other physical or chemical parameter may be determined for the sample received in the sample vessel.

The handling system 5 is configured to handle the plurality of sample vessels 2, and the automation track 6 is provided by the handling system 5 and configured to transport the plurality of sample vessels 2 from a receiving location where the sample vessel 2 may be received in a (transport) rack to the analysis device 4 and, optionally, following to some output device or location.

In addition, an operation control device 7 is provided. The operation control device 7 is connected to at least one of the functional modules 3 and configured to control operation of the at least one functional module 3. The operation control device 7, according to the example shown in FIG. 1, is (for operation control) functionally connected to the analysis device 4, the handling system 5, and the automation track 6.

For conduction operation control for the functional modules 3, the operation control device 7 comprises one or more data processors 8, and an application software running on the one or more data processors 8.

The in-vitro diagnostic system 1 further comprises an error detecting and reporting device 9 for detecting and reporting an operation error. In particular, the error detecting and reporting device 9 is provided for detecting the operating error for the operation of at least one of the plurality of functional modules 3 and the operation control device 7. The error detecting and reporting device 9, for example, may be implemented commonly with the operation control device 7. At least in part, the error detecting and reporting device 9 may be implemented by the application software running on the one or more data processors 8. Alternatively, it may be provided separately from the operation control device 7.

A user interface 10 provided is in communicative connection with the error detecting and reporting device 9. Furthermore, an error repository 11 is provided. The error repository 11 is remotely located with respect to both the plurality of functional modules 3 and the operation control device 7. The error repository 11 may be provided in a remote target or server terminal. The error repository 11 may be connectable to a plurality of in-vitro diagnostic systems provided at different locations for receiving or gathering error report data from the plurality of in-vitro diagnostic systems.

Figure 2:
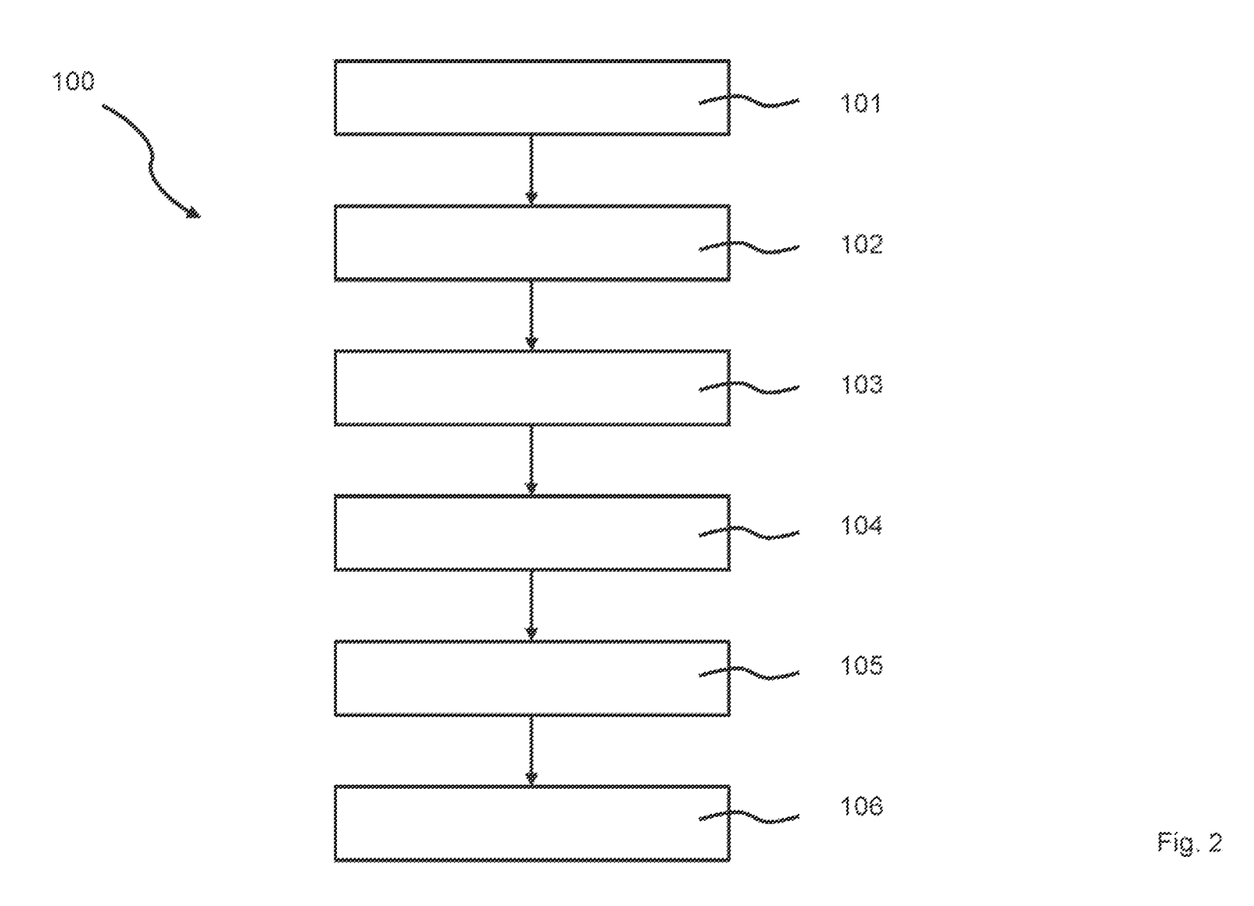

FIG. 2 shows a schematic block diagram for a method of detecting and reporting an operation error 100 in an in-vitro diagnostic system 1.

In step 101, the error for the operation of at least one of the plurality of functional modules 3 and the operation control device 7 is detected. In response, in step 102, error data indicative of the operation error are provided in the error detecting and reporting device 9. The error data may comprise information for which of the functional modules 3 the operation error was detected. Operation errors may be of the type of operation error selected from the following: non-identifiable sample container, sample identification unit was unable to determine the type of sample container or vessel 2; incorrectly prepared sample vessel 2; for example aliquot was requested but too little material is determined to be available in the sample vessel 2; bar code could not be read; and sample vessel 2 not allowed on the in-vitro diagnostic system 1.

In step 103, in response to detecting the operation error, a user input is received through the user interface 10. In response to receiving the user input labelling data are provided in step 104. The labelling data are indicative of information related to the operating error in addition to the error data. The labelling data may be indicative of at least one from the following:
whether the error is correct;
disturbing environmental conditions in the laboratory not recorded by sensors in the device;
intended use, destination, etc. of the material in the sample vessel 2 processed that raised an error;
intended workflow of the entire solution when a module threw an error; and
further contextual information.

In steps 105 and 106, respectively, error report data comprising the error data and the labelling data are provided and transmitted to the error repository 11 remotely located with respect to both the plurality of functional modules 3 and the operation control device 7. The error report data can be used for error and fault analysis for a plurality of in-vitro diagnostic systems, some or all of such in-vitro diagnostic systems providing error report data to the error repository 11. For, example, the error report data may provide for input data such as at least one of training data and validation data of a machine learning process. As result of such processing by the machine learning process, an updated or new application software may be generated and provided to some or all of the plurality of in-vitro diagnostic systems in the field. Thus, centralized error and fault analysis can be conducted for improving operation of the in-vitro diagnostic systems in the field. For such analysis and processing, not only error data as such are gathered and transmit to the error repository 11, but also labelling data generated in response to the user input received at the location of the in-vitro diagnostic system implementation.

The invention claimed is:

1. A method for detecting and reporting an operation error in an in-vitro diagnostic system configured to determine a sample of a bodily fluid, the method comprising:
   providing a plurality of sample vessels, each sample vessel of the plurality of sample vessels containing a sample of a bodily fluid;
   providing a plurality of functional modules comprising an analysis device configured to determine the sample, a handling system configured to handle the plurality of sample vessels, and an automation track provided by the handling system and configured to transport the plurality of sample vessels to the analysis device;
   providing an operation control device connected to at least one functional module of the plurality of functional modules and configured to control operation of the at least one functional module, wherein the operation control device comprises one or more data processors, wherein an application software is running on the one or more data processors for controlling operation of the at least one functional module;
   controlling operation of the at least one functional module by the operation control device; and
   detecting and reporting an operation error by an error detecting and reporting device by:
      detecting the operation error for the operation of the at least one functional module and the operation control device,
      providing error data indicative of the operation error,
      receiving a user input through a user interface after detecting the operation error,
      providing labelling data in response to receiving the user input, the labelling data being indicative of information related to the operation error in addition to the error data,
      providing error report data comprising the error data and the labelling data, and
      transmitting the error report data to an error repository remotely located with respect to both the plurality of functional modules and the operation control device;
   receiving the error report data in a machine learning process running in a data processing device connected to the error repository;
   processing the error report data by the machine learning process in the data processing device;
   providing an application software update for the application software in response to the processing of the error report data by the machine learning process in the data processing device;
   providing the application software update to the operation control device; and controlling operation of the at least one functional module by the operation control device by running the application software including the application software update.

2. The method of claim 1, further comprising preprocessing the error report data in the data processing device, wherein preprocessing the error report data comprises formatting the error report data to formatted error report data having a data format processable by the machine learning process.

3. The method of claim 2, wherein the formatted error report data include a feature vector of features, wherein the features are indicative of operation parameters of the in-vitro diagnostic system.

4. The method of claim 3, wherein the labelling data are formatted such that a target is provided that is linked to the error data; and
wherein the target and the feature vector are provided as inputs to the machine learning process.

5. The method of claim 1, wherein the error data are indicative of an operation error of the analysis device.

6. The method of claim 1, wherein the error data are indicative of an operation error of the handling system.

7. The method of claim 1, wherein the error data are indicative of an operation error of the automation track.

8. The method of claim 1, wherein the error data are indicative of one of a false positive error and a false negative error.

9. The method of claim 1, wherein receiving the user input further comprises:
providing user information data indicative of a plurality of types of operation errors;
outputting the user information data through a display device, thereby presenting a menu of the plurality of types of operation errors on the display device;
receiving the user input through the user interface, the user input being indicative of a user selection of at least one of the plurality of types of operation errors; and
providing labelling data assigned to the at least one of the plurality of types of operation errors selected by the user.

10. The method of claim 9, wherein providing the user information data comprises:
receiving reading data from a data carrier reading device, the reading data being indicative of sample vessel data stored in a data carrier provided on the sample vessel; and
providing the user information data in response to receiving the reading data.

11. The method of claim 9, wherein providing the user information data comprises:
receiving user message data from an input device, the user message data being indicative of at least one of a user video message input and a user audio message input; and
providing the user information data in response to receiving the user message data.

12. The method of claim 9, wherein providing the user information data comprises:
outputting a visual representation of one of the functional modules from the plurality of functional modules and the operation control device through the display device; and
receiving a user selection input indicative of the user selecting the visual representation.

13. The method of claim 9, further comprising:
receiving a user error report message within the receiving of the user input;
generating user error report message data indicative of the user error report message; and
providing the labelling data including the user error report message data.

14. The method of claim 1, wherein the application software update for the application software is provided by the machine learning process.

15. The method of claim 1, wherein the machine learning process identifies at least one systematical error in the in-vitro diagnostic system.

16. The method of claim 1, wherein the operation error relates to an amount or type of the bodily fluid detected in a sample container.

17. The method of claim 1, wherein the operation error relates to an identification of a sample container including the bodily fluid.

18. The method of claim 1, wherein the operation error relates to a determination of a quality of the bodily fluid in a sample container.

19. The method of claim 1, further comprising overwriting at least a portion of the application software with the application software update, resulting in a new application software; and
wherein controlling the operation of the at least one functional module by the operation control device by running the application software including the application software update comprises executing the new application software.

20. An in-vitro diagnostic system configured to determine a sample of a bodily fluid, the in-vitro diagnostic system comprising:
a plurality of sample vessels each sample vessel of the plurality of sample vessels containing a sample of a bodily fluid;
a plurality of functional modules, comprising:
an analysis device configured to determine the sample,
a handling system configured to handle the plurality of sample vessels, and
an automation track provided by the handling system and configured to transport the plurality of sample vessels to the analysis device;
an operation control device that is connected to at least one functional module of the plurality of functional modules and configured to control operation of the at least one functional module, wherein the operational control device comprises one or more data processors that execute an application software for controlling operation of the at least one functional module;
an error detecting and reporting device configured to detect and report an operation error in the in-vitro diagnostic system, wherein to detect and report the operation error comprises to:
detect the operation error for the operation of at least one of the plurality of functional modules and the operation control device,
provide error data indicative of the operation error,
receive a user input through a user interface after detecting the operation error,
provide labelling data in response to receiving the user input, the labelling data being indicative of information related to the operation error in addition to the error data,
provide error report data comprising the error data and the labelling data, and transmit the error report data to an error repository remotely located with respect to both the plurality of functional modules and the operation control device; and a data processing device connected to the error repository and configured to:

receive the error report data in a machine learning process running in the data processing device;

process the error report data by the machine learning process; and provide an application software update for the application software in response to processing the error report data by the machine learning process, wherein the application software update is to be provided to the operation control device for controlling operation of the at least one functional module by the operation control device by running the application software including the application software update.

\* \* \* \* \*